(No Model.)
B. THOENS & A. GERDES.
ABSORPTION ICE MACHINE.
No. 494,906. Patented Apr. 4, 1893.
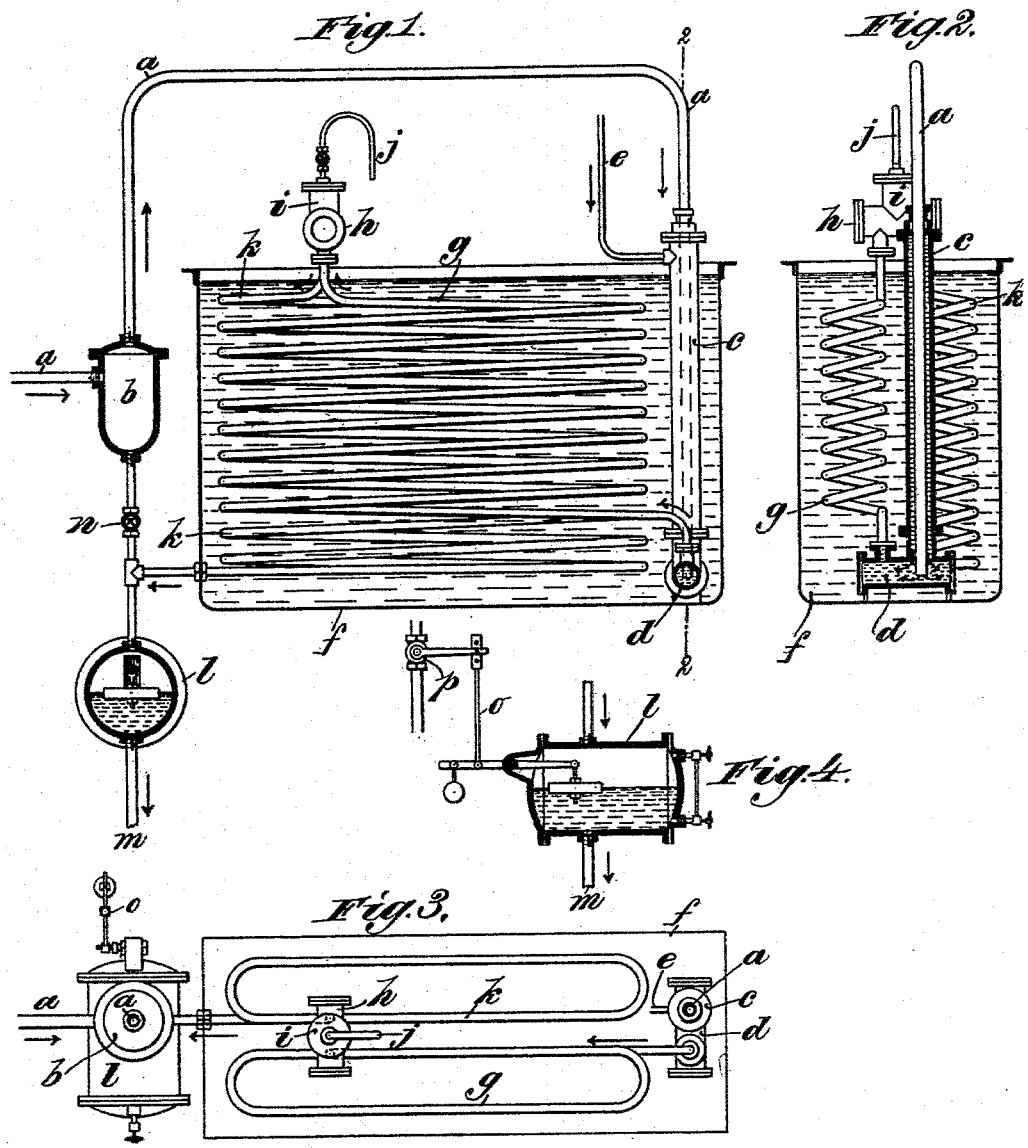
WITNESSES:
INVENTORS
Burchard Thoens
August Gerdes.
By James L. Norris
ATTORNEY

UNITED STATES PATENT OFFICE.

BURCHARD THOENS AND AUGUST GERDES, OF NEW ORLEANS, LOUISIANA.

ABSORPTION ICE-MACHINE.

SPECIFICATION forming part of Letters Patent No. 494,906, dated April 4, 1893.

Application filed November 8, 1892. Serial No. 451,380. (No model.)

*To all whom it may concern:*

Be it known that we, BURCHARD THOENS and AUGUST GERDES, subjects of the Emperor of Germany, residing at New Orleans, in the parish of Orleans and State of Louisiana, have invented new and useful Improvements in Absorption Ice-Machines, of which the following is a specification.

In absorption ice machines, an absorber is employed to re-unite the ammonia gas and the water which have been separated by heat in a retort and during the absorption process heat is evolved or disengaged which must be removed by a continuous stream of cooling fluid. The water remaining in the retort after the gas has been expelled is termed poor liquor, and after the absorption it is termed rich liquor.

The object of our invention is to provide a new and improved absorber by which large quantities of gas will be absorbed in comparatively small quantities of water, whereby a small pump can be utilized to regulate the liquid and a small quantity of liquid requires to be re-heated in the retort, while the consumption of fuel is economized.

The invention also has for its object to provide novel means for removing air and foreign gases without the loss of any considerable quantity of ammonia gas, thereby reducing the pressure in the refrigerating coils, and obtaining a very low temperature.

The invention also has for its object to provide novel means for cooling the rich liquor after the absorption has taken place, so that no gas will be liberated in the suction chamber of the ammonia pump which is liable to prevent its proper working.

The invention also has for its object to automatically regulate the speed of the ammonia pump and to prevent any liquid from going from the absorber into the refrigerating coils when a vacuum is formed therein, which often occurs when the machine ceases operation.

To accomplish all these objects our invention involves the features of construction and the combination or arrangement of devices hereinafter described and claimed, reference being made to the accompanying drawings, in which—

Figure 1, is a detail vertical sectional view of an apparatus embodying our invention. Fig. 2, is a sectional view taken on the line 2—2 Fig. 1. Fig. 3, is a detail plan view; and Fig. 4, is a detail sectional view of the receiver.

Referring to the drawings the ammonia gas after expanding in the refrigerator coils passes through a pipe $a$, and enters a vessel $b$, and from this vessel the pipe $a$ enters an upright pipe $c$ and terminates in the manifold $d$ on the lower end of pipe $c$. A pipe $e$ conducts the water from the retort, after having been cooled, into the pipe $c$, where it is conducted to the manifold $d$ through the space between pipes $a$ and $c$. Here the ammonia gas and water come in contact again and are partly re-united. The heat evolved during the absorption process is carried away by a continuous stream of cooling water entering the tank $f$, in which the absorber is submerged. A coil of pipes $g$ starting from manifold $d$ receives the hot rich liquor and ammonia gas that is not yet absorbed and both passing therethrough are cooled and more gas will be absorbed in transit to the second manifold $h$ which has a collector or air chamber $i$, from whence a valve and pipe $j$ projects, for blowing off air and foreign gases, which cannot be absorbed. A second coil of pipes $k$ now conducts the fully saturated water from manifold $h$ to a receiver $l$ from which a suitable pump returns it to the retort through suction pipe $m$. By means of a valve $n$ the receiver $l$ and the vessel $b$ can be put in communication. The receiver $l$ contains a float or counterbalanced weight, which rises or falls with the liquor, and communicates its motion by a suitable connection $o$ to the steam valve $p$, which regulates the speed of the ammonia pump. It is so adjusted as to run the pump faster when the liquor in the receiver $l$ becomes higher and conversely.

The advantage of our absorber over similarly constructed apparatus, is that we obtain a richer liquor by bringing the cold poor liquor and the ammonia gas in contact in the manifold $d$, and both are compelled to pass out of same through the same outlet into the coil $g$. As the liquor becomes very hot it can only absorb a certain quantum of gas, but both pass upward in a cooling coil, the same liquor is enabled to take up more gas as it becomes cooler, until they reach the upper manifold $h$. Any foreign gas or air which would not be absorbed accumulates in the air chamber $i$ and is blown out through valve and pipe $j$, and as the rich liquor in reaching $h$ is comparatively cool, very little gas will be blown out with it, as the liquor is then capable of retaining it. The presence of air creates considerable pressure in the absorber and consequently in the refrigerator coils. A removal of same will therefore reduce this pressure and a lower temperature can be obtained and the efficiency of the machine will be increased as the same amount of gas will expand more, and take up more heat. The pipe $a$ going into the pipe $c$ is always frosted and cold, and consequently the poor liquor surrounding it on its way down to manifold $d$ will become very cold and is in a good condition to absorb a great quantum of gas. The partly cooled rich liquor leaving manifold $h$ and running down the cooling coil $k$, is finally cooled to almost the temperature of the cooling water so that it is in condition to absorb more gas, if there be present any gas not already absorbed. The liquor then flows into the receiver $l$ from which it is returned by means of a suitable pump through the outlet pipe $m$.

The amount of poor liquor is often varied to suit the pressure in the absorber; therefore the speed of the pump has to be changed, which requires the attendance of a person. To make this variation of pump speed automatic, a float is placed in the receiver $l$, which transmits its up or down motion by a suitable connection $o$ to the steam valve $p$. The float is so adjusted as to open the valve $p$ more if the level of rich liquor rises in the receiver $l$ and vice versa.

The valve $n$ can be used for bringing the receiver $l$ and vessel $b$ in communication for the following purpose. If the machine is stopped the ammonia gas in the refrigerator coils is soon absorbed in the absorber and a vacuum formed, which would draw the liquor out of the absorber into the refrigerator coils, a serious matter when the machine is to be started again. But by opening the valve $n$ the siphon formed would be broken and this cannot occur. Or if by some inattention more poor liquor should be let into the absorber than the cooling coil $k$ could discharge, this surplus of liquor would rise through pipe $a$ and fall into the vessel $b$, which can be emptied into receiver $l$.

It is obvious that for machines of large capacity more than one coil for absorbing and cooling may be used connected to manifolds as shown in drawings. Valves for blowing out air may also be placed on the receiver $l$ and the upper part of pipe $c$.

Having thus described our invention, what we claim is—

1. An absorber for ice machines, consisting of a cooling water tank $f$, a lower manifold $d$, arranged in the bottom portion of the tank, an upper manifold $h$, a receiver $l$ outside of the tank, a coil $g$ arranged in the tank and placing the manifolds in communication, and a coil $k$ arranged in the tank and connecting the upper manifold with the receiver, substantially as described.

2. An absorber for ice machines, consisting of a lower and an upper manifold, the latter having an air chamber provided with a blow out valve, a coil placing the two manifolds in communication, a receiver, a coil connecting the upper manifold with the receiver, a return gas pipe entering the lower manifold, and a poor liquor inlet pipe surrounding the gas pipe and with the latter entering the lower manifold, substantially as described.

3. The combination with an absorber, a receiver, and a return gas pipe, of a vessel interposed in the return gas pipe, and having a pipe connection with the receiver provided with a valve, substantially as described.

4. In an absorber for ice machines, the combination of the cooling tank $f$, the lower and upper manifolds $d$ and $h$, a coil connecting the lower and upper manifolds, a stand pipe $c$ rising from the lower manifold in the tank, and a return gas pipe $a$ extending from the stand pipe into the lower manifold, substantially as described.

5. The combination of the cooling tank $f$, the lower manifold $d$ and upper manifold $h$, the coils $g$ and $k$ connecting the lower and upper manifolds, a stand pipe $c$ rising from the lower manifold in the tank, a vessel $b$, a receiver $l$ having a pipe connection with the vessel, and a return gas pipe $a$ communicating with the said vessel and leading therefrom through the stand pipe into the lower manifold, substantially as described.

In testimony whereof we have hereunto set our hands and affixed our seals in presence of two subscribing witnesses.

BURCHARD THOENS. [L. S.]
AUGUST GERDES. [L. S.]

Witnesses:
E. P. CHAUDET,
E. J. BARNETT.